2,777,002

Patented Jan. 8, 1957

United States Patent Office

2,777,002

PARA-HALOGENATION OF PHENOLS

James D. Sullivan, Webster Groves, Mo., assignor to Monsanto Chemical Company, St. Louis, Mo., a corporation of Delaware No Drawing. Application April 27, 1953, Serial No. 351,481

8 Claims. (Cl. 260—623)

This invention relates to the halogenation of phenols and more specifically pertains to the selective halogenation of phenols in the para position.

Para-halophenols are exceedingly useful compounds. They may be employed as intermediates in the synthesis of other organic compounds through reactions involving either the halogen atom or the hydroxyl group. The o-ethers, that is o-alkoxy and o-aryloxy substituted para-halophenols possess bacteristatic properties. The o-amino and o-substituted compounds containing amino groups are excellent antioxidants for oils and rubber compositions. A number of the o-substituted phenolic compounds are known to possess herbicidal activity while others can be employed as intermediates in the preparation of herbicidal compounds.

The most common para-halophenols employed as an intermediate in the preparation of toxicants for herbicidal compositions are para-chloro-2-methylphenol and para-chlorophenol. These compounds are the intermediates employed in the preparation of 4-chloro-2-methylphenoxyacetic acid (MCP) and 4-chlorophenoxyacetic acid. Both of these phenoxyacetic acids as well as derivatives thereof are exceedingly useful selective herbicides.

Para-halophenols have been prepared by the direct halogenation of the corresponding phenol. However, such a process results in the formation of a mixture of halogenated derivatives such as the desired 4-halo derivative together with 6-halo and dihalophenols. Although the direct halogenation of phenols is known to favor the substitution of halogen in the 4 or para position, yields of the desired 4-halophenols of only about 40 to 60% are the best obtainable by this process. Another method suggested for the preparation of 4-halophenols comprises reacting a phenol with a sulfuryl halide. This method of halogenating a phenol also favors the formation of the 4-halophenol. However, the yield of the desired 4-halophenol obtained by this process is at best about 72% and only slightly better than that obtained by the direct halogenation process.

The 4-halophenols and derivatives thereof, in general, have been found to possess greater biological activity than the 6-halo or 4,6-dihalophenols and the corresponding derivatives. This is especially true when these halogenated phenols are reacted with monochloroacetic acid to form acetic acids. For example, the 6-halo and 4,6-dihalo-2-methyl-phenoxyacetic acids possess only slight herbicidal activity, whereas 4-chloro-2-methyl-phenoxyacetic acid is an exceedingly active selective herbicide. Hence, a method for halogenating phenols by which high yields of the 4-halophenols can be obtained and at the same time suppress the formation of the 6-halo and 4,6-dihalos would be extremely useful. It is an object of this invention to provide a method of halogenating phenols whereby a high yield of para-halogenated phenol can be obtained. It is also an object of this invention to provide a method whereby high yields of 4-halophenols can be produced by a process not only suitable for industrial application but which is also commercially feasible. Other objects of this invention will be apparent from the description which follows.

It has now been discovered that phenols and especially phenols having the following structural formula:

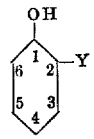

where Y is hydrogen or an ortho-para directing group such as the hydroxy group, an ether group such as the alkoxy and aryloxy groups, an alkyl group, an amino group, and mono- and di-substituted amino groups as well as organic groups containing amino, nitro, halo, and hydroxy groups; can be converted to the corresponding 4-halophenol in high yields by reacting at a temperature not exceeding about 50° C. said phenol with a sulfuryl halide in the presence of a metallic halide such as commonly employed in Friedel-Crafts reactions. By this process, yields of 4-halophenols as high as 95% can be obtained. Since the 4-chloro derivatives of the above phenols are at the present the 4-halophenolic compounds preferred as toxicants and as intermediates, the practice of this invention will be described and illustrated by the preparation of 4-chlorophenols through the reaction of the above phenols with sulfuryl chloride in the presence of metallic chlorides. It will, of course, be understood by those skilled in the art that the other 4-halophenols such as 4-bromo, 4-iodo and 4-fluorophenols can be prepared in a similar manner by employing sulfuryl bromide, sulfuryl iodide, or sulfuryl fluoride as the halogenating agent and by carrying out the reaction in the presence of a metallic bromide, iodide, or fluoride.

The phenolic reactants which can be employed in the process of this invention includes among others phenol; catechol; o-cresol, o-ethylphenol, o-n-propylphenol, o-isopropylphenol, o-butylphenol, o-tert.-butylphenol, o-sec.-butylphenol, o-amylphenol, o-hexylphenol, o-heptylphenol, o-octylphenol, o-sec.-octylphenol, o-tert.-octylphenol, o-octadecylphenol, o-nonylphenol, o-pentadecylphenol, o-cyclohexylphenol, o-cyclopentylphenol, o-cetylphenol, o-allylphenol, o-vinylphenol, o-phenylphenol, o-(o'-chlorophenyl) phenol, o-(para-chlorophenyl) phenol, o-benzylphenol, o-phenethylphenol, o-isovalerylphenol, o-(1-ethylallyl) phenol, o-(o'-ethylphenyl) phenol, o-methylallylphenol, o-(alpha-methylbenzyl) phenol, o-(1-phenylallyl) phenol, o-(alpha-methylbutyl) phenol, o-alpha-methylheptyl) phenol, o-(gamma-phenylpropyl) phenol, o-biphenylphenol, o-cinnamylphenol, o-pentenylphenol, o-ethylnylphenol; compounds containing two o-phenol groups as o,o'-ethylenediphenol, o,o'-diethylenediphenol, 2,2'-di-(hydroxyphenyl) ether; o-aminophenols, N-substituted o-aminophenols and other NH₂ containing substituents such as o-(N-methylamino)-phenol, o-(methylamino) phenol, o-(ethylamino) phenol, o-(N-ethylamino) phenol, o-(1-ethylaminopropyl) phenol, o-(2-ethylbutylideneamino) phenol, o-methyleneamino-phenol, o - (diethylamino) - phenol, o-(dimethylamino) phenol, o - dimethylaminoethoxyphenol, o - (dimethylaminobutyl) phenol, o-(2-isopropylmethylaminobutyl)-phenol, o-(2-aminoethoxy) phenol, o-(2-aminoisopropyl) phenol, o-(beta-aminoisopropyl) phenol, o-(2-aminopropyl) phenol, 2-(1-aminopropyl) phenol, o-[2-(2-biphenyloxy)ethylamino] phenol; Y=ether group: o-alloxyphenol, guaiacol, o-ethoxyphenol, o-propoxyphenol, o-isopropoxyphenol, o-butoxyphenol, o-amyloxyphenol, o-heptoxyphenol, o-hexoxyphenol, o-isoamyloxyphenol, o - (aminoethoxy) - phenol, o-(beta-diethyloxyphenol, o - (beta-methylaminomethoxy) aminoethoxy) phenol, o-(alpha-methylbutoxy) phenol, o-phenoxyphenol, o-benzyloxyphenol, o-(p-nitrophenoxy) phenol, o- phenethyloxy-phenol, o-vinyloxyphenol, o-(o'-aminophenoxyphenol; and o-(methylmercapto) phenol.

Metal halides which can be employed in the process of this invention include the halides of aluminum, iron, zinc, tin and titanium. The metal halides which are preferred for the preparation of the preferred para-chlorophenols are the halides of aluminum, iron, and tin, especially the aluminum, ferric and stannic chorides.

More specifically, the process of this invention comprises adding to the liquid reaction medium containing the phenolic reactant at least 1.0 mole and preferably 1.1 mole of a sulfuryl halide per mole of the phenolic reactant and from 0.5% to 2% by weight of the metal halide based on the phenolic reactant while maintaining a reaction temperature of from 0° C. to about 75° C. When the phenolic reactant is a solid at the above temperatures, an inert reaction diluent which is a solvent for the phenolic compound is used to provide a liquid reaction mixture. An inert solvent can also be employed with the liquid phenolic reactants but the presence of a solvent is not essential.

For optimum results, it is desirable to maintain the reaction temperature below 50° C. and preferably within the range of 5° C. to 35° C. until all the sulfuryl halide has been consumed. The end point of the reaction can be readily determined. Since the reaction produces sulfur dioxide and hydrogen chloride, the off gases from the reactor can be tested periodically to determine the amount of sulfur dioxide or hydrogen chloride being given off. In general the reaction can be assumed to have reached an end point when there is only a faint trace of hydrogen chloride or sulfur dioxide in the off gases from the reactor. Although temperatures in excess of 50° C. favor the formation of the 6-halo derivative and the dihalo derivative of the phenolic reactant, especially during the early stages of the reaction, the temperature of the reaction medium can be increased slowly as the reaction approaches the end point without sacrificing any appreciable yield of the desired 4-halo product. By increasing the reaction temperature near the end of the reaction, better contact between the sulfuryl halide and the phenolic reactant is provided especially when the reaction mixture becomes viscous as in the case where the halogenated products are soluble in the reaction medium or when a slurry of the halogenated products is formed where the end products are insoluble in the reaction mixture.

The following specific examples described the process of this invention in detail. However, it is not intended that the present invention be limited to the precise quantities of reactants employed, the precise reaction conditions or the manner in which the products are recovered or used. In the examples which follow the term "parts" is employed to indicate parts by weight.

EXAMPLE I

To a reactor fitted with a stirring device, a cooling coil, a condenser, and a means for measuring the temperature of the reaction medium there is charged 216 parts (2 moles) of o-cresol and 2.2 parts of ferric chloride. This mixture is stirred and cooled to 15° C. and cooling is stopped. Then 297 parts of sulfuryl chloride (2.1 moles) are added slowly at about five parts per minute to the stirred o-cresol. The reaction mixture warms gradually due to the exothermic nature of the reaction. When the temperature of the reaction mixture reaches about 30° C., cooling of the reaction mixture is started by passing water through the cooling coil. The rate of flow of water through the coil is adjusted to maintain the reaction temperature between 35° C. and 40° C. The sulfur dioxide generated in the reaction vessel is vented to the atmosphere through the condenser to an exhaust vent in such a manner that the off gases from the reactor can be tested for sulfur dioxide. After all the sulfuryl chloride is added, the reaction mixture is maintained at 35° C. to 40° C. with cooling or heating as required and stirred until sulfur dioxide is no longer given off. After about 17 hours there will be only a slight trace of sulfur dioxide in the off gases from the reactor and the reaction mixture is degassed at reduced pressure, about 50 mm. Hg, at room temperature for about one hour and then distilled at 40 mm. Hg from 125° C. to about 200° C.

There is recovered 270 parts, a 95% yield, of a product having a crystallizing point of 39.6° C. By infrared analysis it was found that this product contained 86% 4-chloro-2-methylphenol, 8% 6-chloro-2-methylphenol, 0.5% 4,6-dichloro-2-methyl-phenol and about 6% o-cresol. Thus of the chlorinated products over 91% is 4-chloro-2-methylphenol. The yield of the desired 4-chloro derivative based on the o-cresol charged is 80%.

EXAMPLE II

The process of Example I is repeated except that no ferric chloride is charged. The distilled product having a crystallization point of 30.4° C. contains, as chlorinated compounds determined by infrared analysis, only 69% 4-chloro-2-methylphenol, 18% 6-chloro-2-methylphenol, 2% 4,6-dichloro-2-methylphenol, and 11% o-cresol. Thus, by folowing the process suggested by the art, there is obtained a product containing only 70% of the desired 4-chloro derivative and nearly 12% of the original o-cresol charged remains unchlorinated. The yield of the desired 4-chloro product based on the o-cresol charged is 67%.

EXAMPLE III

The process of Example I is repeated except that the reaction temperature during sulfuryl chloride addition is held at 20° C., the sulfuryl chloride is added over a period of ten minutes, the reaction mixture is held at 20° C. for about 11 hours, heated slowly to 55° C. over a 90 minute period and then degassed and distilled.

The distilled product is condensed with monochloroacetic acid in the presence of sodium hydroxide, the resulting mixture acidified, steam distilled and acidified to obtain the product in an acid form. The composition of the resulting condensate as determined by ultraviolet analysis is as follows

| | Percent |
|---|---|
| 4-chloro-2-methylphenoxyacetic acid | 91.0 |
| 4,6-dichloro-2-methylphenoxyacetic acid | 0 |
| 2-methylphenoxyacetic acid | 3.0 |
| Unreacted cresols | 2.4 |
| Unaccounted for (by difference) | 13.6 |

¹ Probably 6-chloro-2-methylphenoxyacetic acid.

EXAMPLE IV

The process of Example I is repeated except that the chlorination temperature was held at 10° C. The distilled product obtained is condensed with monochloroacetic acid in the presence of sodium hydroxide and the condensate acidified to convert the condensate to the acids. The composition of the resulting condensate in the acid form as determined by ultraviolet analysis is as follows

| | Percent |
|---|---|
| 4-chloro-2-methylphenoxyacetic acid | 93.5 |
| 4,6-dichloro-2-methylphenoxyacetic acid | 0 |
| 2-methylphenoxyacetic acid | 1.3 |
| Unreacted cresols | 2.6 |
| Unaccounted for (by difference) | 12.6 |

¹ Probably 6-chloro-2-methylphenoxyacetic acid.

EXAMPLE V

The process described in Example I is repeated except that the reaction temperature during sulfuryl chloride addition is maintained at 20° C., all the sulfuryl chloride is added at one time, the reaction mixture is held at 20° C. for eight hours, and then the reaction temperature is increased at the rate of five degrees each two hours until a maximum of 55° C. is reached. The resulting mixture is degassed at 55° C. and 50 mm. Hg for one hour and distilled at 50 mm. Hg.

The recovered distillate is condensed with monochloroacetic acid in the presence of sodium hydroxide, acidified to a pH of about 4, steam distilled and acidified to convert all of the organic components to the corresponding acids. The composition of the resulting product as determined by ultraviolet analysis is as follows

| | Percent |
|---|---|
| 4-chloro-2-methylphenoxyacetic acid | 95 |
| 4,6-dichloro-2-methylphenoxyacetic acid | 0 |
| 2-methylphenoxyacetic acid | 0.9 |
| Unreacted cresols | 1.3 |
| Unaccounted for (by difference) | [1] 4.1 |

[1] Probably 6-chloro-2-methylphenoxyacetic acid.

EXAMPLE VI

To a reaction vessel as described in Example I there is added 216 parts (2 moles) of o-cresol at 30° C., 2.2 parts of aluminum chloride and 297 parts of sulfuryl chloride. The resulting mixture is stirred and cooled to 20° C. and held at that temperature for eight hours. The temperature of the reaction mixture was increased to 52° C. over a 60 minute period, degassed at 50° C. for 60 minutes at 50 mm. Hg for one hour and then distilled at 45 to 48 mm. Hg at 58° to 143° C.

The resulting distillate was condensed with monochloroacetic acid in the presence of sodium hydroxide at 95 to 100° C., acidified to a pH of about 4, steam distilled, and acidified to precipitate all the organic compounds from the aqueous distillate. The composition of the resulting product as determined by ultraviolet analysis is as follows:

| | Percent |
|---|---|
| 4-chloro-2-methylphenoxyacetic acid | 86.8 |
| 4,6-dichloro-2-methylphenoxyacetic acid | 0 |
| 2-methylphenoxyacetic acid | 5.8 |
| Unreacted cresols | 2.3 |
| Unaccounted for (by difference) | [1] 2.8 |

[1] Probably 6-chloro-2-methylphenoxyacetic acid.

EXAMPLE VII

The chlorination process of Example VI is repeated except that no catalyst was employed. The condensation of the distillate from the chlorination process with monochloroacetic acid is carried out in the same manner as described in Example VI. The ultraviolet analysis indicates the presence of 76.6% 4-chloro-2-methylphenoxyacetic acid, 2.8% 4,6-dichloro-2-methylphenoxyacetic acid, and 20.6% 6-chloro-2-methylphenoxyacetic acid.

A comparison of the results of the processes described in Examples I and II clearly demonstrate that the process of this invention is vastly superior to the prior art process of chlorination with sulfuryl chloride in the absence of a metal chloride catalyst. A comparison of the total chlorinated compounds in the products of Examples I and II does not illustrate the uniqueness of the process of this invention. Rather it is the comparison of ratio of the 4-chloro derivative to the 6-chloro derivative in these products which provides one of the bases for the marked superiority of the process of this invention. The ratio of 4-chloro to 6-chloro in the product of Example I is almost 11 to 1 while the same ratio in the product of Example II is only about 4 to 1. Furthermore, there is only one-fourth as much dichloro derivative in the product of Example I as is in the product of Example II. In addition there is about 25% more 4-chloro derivative in the product of Example I than in the product of Example II. The greatly higher ratio of 4-chloro to 6-chloro, the much lower dichloro content and the vastly increased 4-chloro content in the product obtained by the process of this invention are indeed surprising in view of the fact that the process of this invention employs materials which are known to accelerate chlorination. The uniqueness of the process of this invention is even more striking when the mechanics of the reaction are considered. It is known that the phenolic reactants employed in the process of this invention, halogenate in both the 4 and 6 position but that halogenation in the 4 position is favored. Example II clearly demonstrates this fact. However, the use of a known chlorination catalyst does not enhance the rate of chlorination but rather modifies the normal halogenating tendencies of the reaction and greatly suppresses both the formation of the 6-halo derivative and the 4,6-dihalo derivative.

The superiority of the process of this invention is further emphasized by Examples III to VI where the phenoxyacetic acid products contained from 87% to 95% 4-chloro-2-methylphenoxyacetic acid (MCP) while, as shown in Example VII, the product of the prior art produces a phenoxyacetic acid composition containing only 76.6% of MCP.

As hereinbefore stated, phenolic compounds other than o-cresol can be employed in the process of this invention. For the sake of simplicity of presentation the use of other phenolic reactants is illustrated in the following table where only the reactants and the desired halogenated products are shown. The details of the reactions are believed to be sufficiently illustrated in the above seven examples.

Table I

| Example No. | Phenolic Reactant | Sulfuryl Halide | Catalyst | Principal Product |
|---|---|---|---|---|
| VIII | Catechol | $SO_2Cl_2$ | $FeCl_3$ | p-chlorocatechol. |
| IX | Guaiacol | $SO_2Cl_2$ | $FeCl_3$ | 4-chloro-2-methoxyphenol. |
| X | o-Cyclohexoxyphenol | $SO_2Cl_2$ | $FeCl_3$ | 4-chloro-2-cyclohexoxyphenol. |
| XI | o-Cyclohexylphenol | $SO_2Cl_2$ | $FeCl_3$ | 4-chloro-2-cyclohexyl-phenol. |
| XII | o-Aminophenol | $SO_2Cl_2$ | $FeCl_3$ | 4-chloro-2-aminophenol. |
| XIII | o-(N-methylamino) phenol | $SO_2Cl_2$ | $FeCl_3$ | 4-chloro-2-(N-methylamino) phenol. |
| XIV | o-(diethylamino) phenol | $SO_2Cl_2$ | $FeCl_2$ | 4-chloro-2-(diethylamino) phenol. |
| XV | o-(dimethylaminoethoxy) phenol | $SO_2Cl_2$ | $FeCl_3$ | 4-chloro-2-(dimethylaminoethoxy) phenol. |
| XVI | o,o'-Oxydiphenol [2,2'-di-(hydroxyphenyl) ether] | $SO_2Cl_2$ | $FeCl_3$ | o,o'-oxy-di-p-chlorophenol. |
| XVII | o,o'-ethylenediphenol | $SO_2Cl_2$ | $FeCl_3$ | o,o'-ethylene-di-p-chlorophenol. |
| XVIII | o-Methylmercaptophenol | $SO_2Cl_2$ | $FeCl_3$ | 4-chloro-2-(methylmercapto) phenol. |

When Y, the ortho-substituent on the benzene ring, of the phenolic compounds having the formula hereinbefore set forth contains an aryl group such as a phenyl group as in o-phenyl-phenol, o-benzylphenol, o-(N-methylaniline) phenol, etc., this aryl group will also be halogenated during the process of this invention. The precise point of halogen substitution in such rings will, of course, be dependent upon the nature of the other substituents on the ring as will be understood by those skilled in the art. Thus, where phenolic compounds containing phenyl or substituted phenyl groups in the ortho position or in the group in the ortho position are employed as reactants, the quantity of the sulfuryl halide reactant employed will have to be increased so that there is present at least one mole and preferably 1.1 mole of the sulfuryl halide per benzene ring equivalent in the phenolic reactant

What is claimed is:

1. In the process for preparing primarily a phenolic compound having a halogen in the position para to the hydroxyl group by the halogenation of the corresponding phenolic compound which normally halogenates in both the ortho and para positions, the steps comprising reacting said phenolic compound which normally halogenates in the ortho and para position with at least one mole but not in excess of about 1.1 moles of a sulfuryl halide for each benzene ring in said phenolic compound, in the presence of a Freidel-Crafts type metal halide catalyst and at a temperature not exceeding about 75° C.

2. In the process for preparing primarily a phenolic compound having a chlorine in the position para to the hydroxyl group by the chlorination of the corresponding phenolic compound which normally chlorinates in both the ortho and para positions, the steps comprising reacting said phenolic compound which normally chlorinates in the ortho and para position with at least one mole but not in excess of about 1.1 moles of sulfuryl chloride per benzene ring in said phenolic compound in the presence of from 0.5 to 2.0% by weight of a Friedel-Crafts metal halide catalyst based upon the phenolic reactant at a temperature not exceeding about 75° C.

3. In the process for preparing primarily 4-chloro-2-alkylphenols by the chlorination of an o-alkylphenol, the steps comprising reacting an o-alkylphenol with at least an equimolecular equivalent but not in excess of about 1.1 moles of sulfuryl chloride in the presence of from 0.5 to 2.0% by weight of ferric chloride based on the phenolic reactant, and at a temperature not exceeding about 75° C.

4. In the process for preparing primarily 4-chloro-2-alkylphenols by the chlorination of an o-alkylphenol, the steps comprising reacting an o-alkylphenol with at least an equimolecular equivalent but not in excess of about 1.1 moles of sulfonyl chloride in the presence of from 0.5 to 2.0% by weight of aluminum chloride based on the phenolic reactant, and at a temperature not exceeding about 75° C.

5. In the process for preparing primarily 4-chloro-2-methylphenol by the chlorination of o-cresol, the steps comprising reacting o-cresol with at least an equimolecular equivalent but not in excess of about 1.1 moles of sulfuryl chloride in the presence of from 0.5 to 2.0% by weight of ferric chloride based on the phenolic reactant, and at a temperature not exceeding about 75° C.

6. In the process for preparing primarily 4-chloro-2-methylphenol by the chlorination of o-cresol, the steps comprising reacting o-cresol with at least an equimolecular equivalent but not in excess of about 1.1 moles of sulfuryl chloride in the presence of from 0.5 to 2.0% by weight of aluminum chloride based on the phenolic reactant, and at a temperature not exceeding about 75° C.

7. In the process for preparing primarily 4-chloro-2-methylphenol, the steps comprising adding at 25° C. or below at least an equimolecular portion but not in excess of about 1.1 moles of sulfuric chloride to o-cresol containing ferric chloride, controlling and maintaining the reaction temperature at about 20° C. until the reaction has substantially reached its end point, and slowly increasing the temperature of the reaction medium to about 75° C.

8. The process of claim 7 wherein the reaction is carried out at 20° C. for eight to ten hours and then slowly heated to about 50° C.

References Cited in the file of this patent

UNITED STATES PATENTS 2,494,993     Foster _____ Jan. 17, 1950

OTHER REFERENCES

Sah et al.: Jour. Amer. Chem. Soc., vol. 63 (November 1941), pp. 3164–7.

UNITED STATES PATENT OFFICE
Certificate of Correction

Patent No. 2,777,002                                                      January 8, 1957

James D. Sullivan

It is hereby certified that error appears in the printed specification of the above numbered patent requiring correction and that the said Letters Patent should read as corrected below.

Column 5, line 15, Example V, for "4.1" read —2.8—; line 40, Example VI, for "2.8" read —4.1—; column 6, *Table I*, under the heading "Catalyst" and opposite "XIV", for "FeCl$_2$" read —FeCl$_3$—.

Signed and sealed this 10th day of December 1957.

[SEAL]

Attest:
KARL H. AXLINE,
*Attesting Officer.*

ROBERT C. WATSON,
*Commissioner of Patents.*